(12) United States Patent
Loubiere

(10) Patent No.: US 9,566,946 B2
(45) Date of Patent: Feb. 14, 2017

(54) SYSTEMS, METHODS, AND COMPUTER READABLE MEDIA FOR PROTECTING AN OPERATOR AGAINST GLARE

(71) Applicant: AIRBUS (S.A.S.), Blagnac (FR)

(72) Inventor: Vincent Loubiere, Toulouse (FR)

(73) Assignee: AIRBUS (S.A.S.), Blagnac (FR)

( * ) Notice: Subject to any disclaimer, the term of this patent is extended or adjusted under 35 U.S.C. 154(b) by 152 days.

(21) Appl. No.: 13/944,567

(22) Filed: Jul. 17, 2013

(65) Prior Publication Data

US 2014/0039730 A1 Feb. 6, 2014

(30) Foreign Application Priority Data

Jul. 17, 2012 (FR) .......................... FR20120056879

(51) Int. Cl.
| | |
|---|---|
| *G01C 23/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B60R 99/00* | (2009.01) |
| *B64D 47/00* | (2006.01) |
| *B64C 1/14* | (2006.01) |
| *B64D 45/00* | (2006.01) |
| *G02B 27/01* | (2006.01) |

(52) U.S. Cl.
CPC ............. *B60R 99/00* (2013.01); *B64C 1/1476* (2013.01); *B64D 45/00* (2013.01); *B64D 47/00* (2013.01); *G02B 27/01* (2013.01); *G02B 2027/014* (2013.01); *G02B 2027/0118* (2013.01)

(58) Field of Classification Search
CPC .................... B60R 99/00; B64D 47/00; G06F 3/042–3/0428; G02F 1/0128
USPC ............................................... 701/3; 359/315
See application file for complete search history.

(56) References Cited

U.S. PATENT DOCUMENTS

| | | | |
|---|---|---|---|
| 6,571,166 B1 * | 5/2003 | Johnson ................. | G08G 5/065 340/972 |
| 2002/0118113 A1 * | 8/2002 | Oku ..................... | G08B 13/181 340/573.1 |

(Continued)

OTHER PUBLICATIONS

French Search Report for Application No. 12 56879 dated Apr. 11, 2013.

*Primary Examiner* — Harry Oh
(74) *Attorney, Agent, or Firm* — Jenkins, Wilson, Taylor & Hunt, P.A.

(57) ABSTRACT

Systems, methods and computer readable media for protecting a pilot of an aircraft or an operator of a vehicle against glare from a luminous object. A system for attenuating glare experienced by an operator of a vehicle is provided with a transparent display unit or screen with adjustable pixels that is interposed between an operator of a vehicle and all or part of a windshield of the vehicle, and a device to control pixel intensity to attenuate glare from a luminous object. A system is provided with a positioning module for determining the position of the operator inside the vehicle, and for determining the position of at least one luminous object outside the vehicle that is a source of glare experienced by the operator. A system is provided with a computing device for computing a glare line between the operator and luminous object and the position of the display screen where the glare line intersects the display unit.

21 Claims, 7 Drawing Sheets

(56) References Cited

U.S. PATENT DOCUMENTS

| | | | |
|---|---|---|---|
| 2002/0130311 A1* | 9/2002 | Lieber | B01J 23/50 257/1 |
| 2006/0104488 A1* | 5/2006 | Bazakos | G06K 9/00255 382/118 |
| 2006/0256140 A1* | 11/2006 | Turner | G09B 9/307 345/690 |
| 2007/0047089 A1* | 3/2007 | Mardirossian | B60J 3/04 359/609 |
| 2008/0048101 A1* | 2/2008 | Romig | B60J 3/04 250/221 |
| 2009/0168185 A1* | 7/2009 | Augustine | B60J 3/04 359/613 |
| 2010/0094501 A1* | 4/2010 | Kwok | G02B 27/01 701/36 |
| 2012/0126099 A1* | 5/2012 | Tewari | B60J 3/04 250/214 D |
| 2014/0128972 A1* | 5/2014 | Khraiche | A61L 27/18 623/6.63 |

* cited by examiner

SYSTEMS, METHODS, AND COMPUTER READABLE MEDIA FOR PROTECTING AN OPERATOR AGAINST GLARE

CROSS-REFERENCE TO RELATED APPLICATION

This application claims priority to French Patent Application No. FR20120056879 filed on Jul. 17, 2012, the entire content of which is incorporated by reference herein.

TECHNICAL FIELD

The subject matter described herein relates generally to systems for protecting an aircraft or other vehicle operator against glare or dazzle effects. More particularly, systems, methods and computer readable media are provided for integration into a flight deck of an aircraft, which includes a spacecraft, or into a cabin of a ground-based vehicle in order to reduce the effects of glare from a light source originating outside of the aircraft or vehicle.

BACKGROUND

Glare, dazzle or flash-blindness is a consequence of a light differential that is too high for the adaptation capability of the human eye. While operating an aircraft or ground-based vehicle, glare can significantly reduce an operator's visual comfort, cause temporary blindness and inability to properly operate an aircraft or vehicle, and even prolonged decline in visual performance.

Glare varies considerably depending on whether the source of light differential is situated at the center or at the edge of an operator's field of vision. The zone most sensitive to glare effects is the center of the field of vision, which corresponds to the central part of the retina in the human eye.

When an intense light differential is situated at the center of an operator's field of vision, the inconvenience experienced may be intense and prolonged over time, even after the glare has ceased. This may be detrimental to the operator's concentration, particularly while trying to operate an aircraft or vehicle.

Therefore, devices for protecting against glare effects are particularly necessary so as to ensure comfort and optimal safety while operating an aircraft or vehicle.

While operating a land-based vehicle, such as for example an automobile, glare may be due to light from the sun during the day, including direct sunlight, sunlight that reflects off other automobile surfaces, or sunlight reflecting off reflective road surfaces. At night, glare experienced by a vehicle operator may be due to headlights from other vehicles, including for example overly intense lighting caused by poorly adjusted automobile headlights, or other exterior sources of light, such as for example street lights.

While operating an aircraft, glare may be caused by light from the sun, especially during the aircraft approach and takeoff phases when the elevation of the sun is low with respect to the horizon.

The devices for protecting against glare caused by sunlight that are traditionally used in either aircraft or other vehicles are generally mechanical devices, such as sunshades or other moveable panels.

At night, no effective system exists which makes it possible to reduce glare. In such a case, an operator can simply avoid staring directly at the glaring object in order to protect the accommodation of his or her eyes to the light differential. It is understood, however, that this solution is not suitable for safe operation of aircraft or vehicles as it reduces operator concentration and awareness.

In passenger transport aircraft for example, the flight decks comprise light-blanking panels which are mounted on the ceiling of the flight deck and which can be moved so as to be positioned facing at least one of the windows of the flight cabin, in order to reduce the light transmission area. The panels can be of fixed size and generally intended to blank out an entire window. However, they are not practical to manipulate due to the restricted size of the flight cabin, or with the loss of visual use of an entire window for operational purposes. This manipulation may also become inconvenient during the takeoff or approach maneuvers, when the pilot has to concentrate on his or her piloting task and is adversely affected by glare. Finally, the integration of these mechanical items into the flight cabin requires particular fitting out of the instruments and control panels.

In aeronautics, certain concepts have been proposed in order to alleviate these problems. Mention has been be made especially of electronic devices of sunshade type. One of the proposed solutions uses electrochromic glazings which become darker or lighter under the effect of an electrical voltage whose amplitude is in turn dependent on a voltage provided by a brightness sensor. Such sunshade devices have been tested on trial craft, where certain windows of whose flight deck were provided with electrochromic glazings disposed inside the flight deck. More precisely, layers of electrochromic glazings were disposed on the windows of the flight deck.

However, these sunshade devices decreased the luminous transmission too considerably and over the entire surface area of a window when they were activated and have not therefore been adopted for their use in a flight deck.

Consequently, one of the objectives of present subject matter is to provide systems, methods and computer readable media for protecting against glare caused by light from the sun or luminous objects and which allows progressive and localized attenuation of the light.

SUMMARY

It is an object of the presently disclosed subject matter to provide systems, methods, and computer readable media for protecting an operator of an aircraft or other vehicle against glare.

An object of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

The presently disclosed subject matter can be better understood by referring to the following figures. The components in the figures are not necessarily to scale, emphasis instead being placed upon illustrating the principles of the presently disclosed subject matter (often schematically). In the figures, like reference numerals designate corresponding parts throughout the different views. A further understanding of the presently disclosed subject matter can be obtained by reference to an embodiment set forth in the illustrations of the accompanying drawings. Although the illustrated embodiment is merely exemplary of systems for carrying out the presently disclosed subject matter, both the organization and method of operation of the presently disclosed subject matter, in general, together with further objectives and advantages thereof, may be more easily understood by reference to the drawings and the following description. The drawings are not intended to limit the scope of this presently disclosed subject matter, which is set forth with particularity in the claims as appended or as subsequently amended, but merely to clarify and exemplify the presently disclosed subject matter.

For a more complete understanding of the presently disclosed subject matter, reference is now made to the following drawings in which.

DETAILED DESCRIPTION

Figure 1:
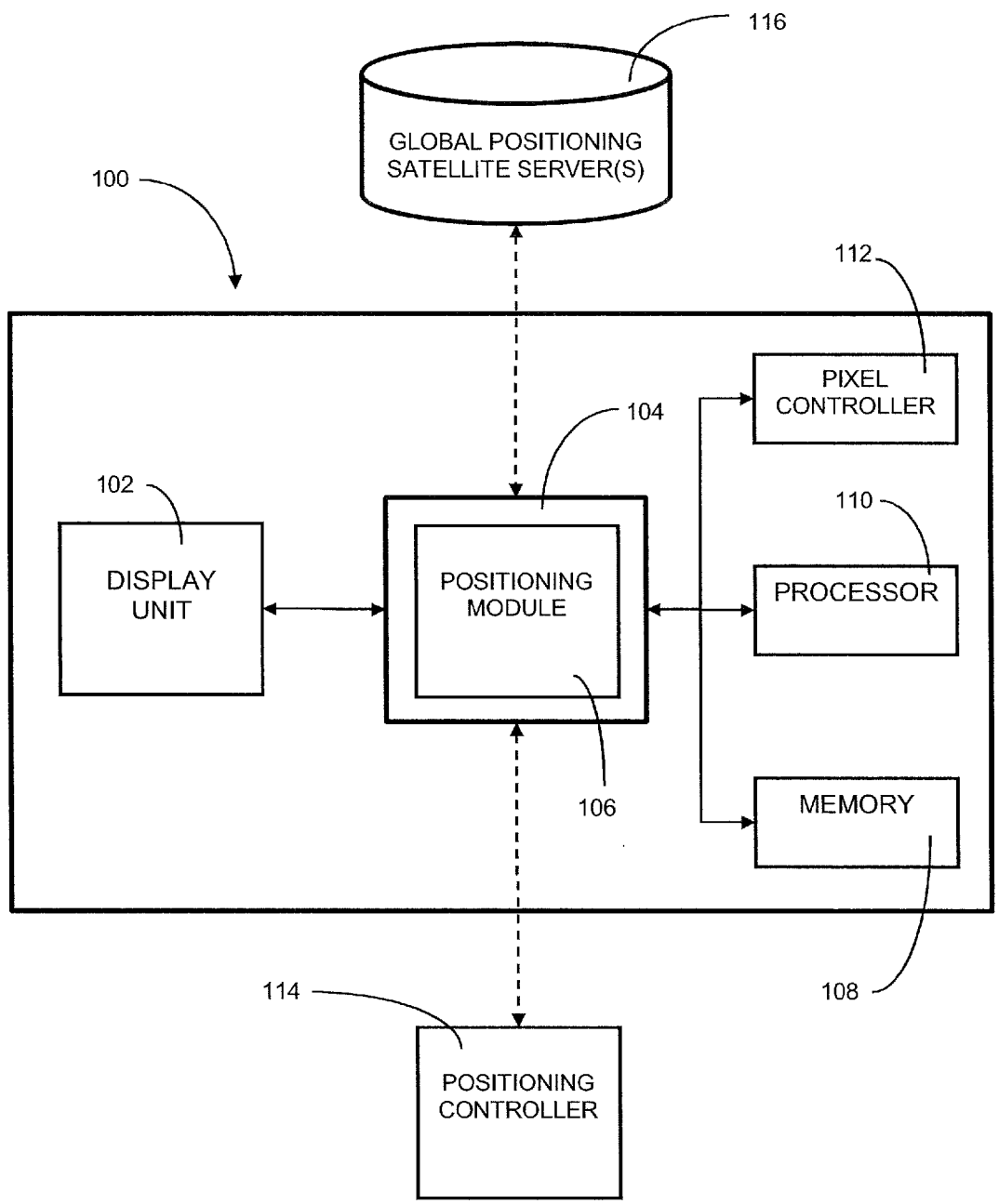
FIG. 1 is a block diagram illustrating an exemplary system for providing protection against glare for an operator of an aircraft or vehicle in accordance with aspects of the subject matter described herein.

In accordance with the description herein and exemplary, associated drawings, novel systems, methods, and computer readable media are disclosed for protecting an operator of an aircraft or vehicle against glare. Systems, methods, and/or computer readable media described herein offer several features configured for protecting an operator from glare effects caused by light from the sun or other luminous objects that obstruct or reduce the visual capacity of the operator. In some aspects, the subject matter described herein includes systems, methods, and/or computer readable media for providing adaptive optical filtering control for the reduction of glare affecting an operator of any aerial or terrestrial vehicle.

In some aspects, a system comprises an at least one transparent display screen, or display unit, and a pixel controller for the at least one display unit, disposed between an operator and all or part of a windshield of a vehicle cabin. The system also comprises a computing platform comprising a positioning module configured to calculate the location of a midpoint between the eyes of an operator, as well to calculate a center-point of an at least one luminous object outside the vehicle that is a source of glare. A luminous object can, for example and without limitation, be the sun, lights from an aircraft or other vehicle, a laser or any other source of light, glare, dazzle or flash-blindness. The positioning module is configured to calculate a line, referred to as a glare line, between these points such that it intersects with the at least one display unit. The computing platform comprises a pixel controller that darkens a portion of the at least one display unit corresponding to the location of intersection between the glare line and the at least one display unit. In some embodiments, the system is also configured to communicate with global positioning satellite servers via a global positioning system (GPS) module such that the spatial and temporal coordinates of the vehicle are determined, allowing the coordinates of the center of the luminous object to be determined with reference to a second coordinate reference frame having an origin at the center of a GPS module in the vehicle. The computing platform is configured to calculate the coordinates of the center of the luminous object with respect to the first coordinate reference frame through a coordinate transformation.

In some aspects the system comprises a first camera, with the computing platform configured to compute the coordinates of the center of the luminous object in the first coordinate reference frame on the basis of images provided by the first camera. The computing platform is configured to compute the center of the luminous object with respect to a third coordinate reference frame with an origin at the center of the camera. The center of the luminous object is then calculated with respect to the first coordinate reference frame through a coordinate transformation change.

In some aspects, a method for determining the location of glare with respect to the operator is provided. The method occurs, at least in part, at a computing platform including a processor and memory. The method comprises calculating a location, such as the location of a midpoint between the eyes of an operator, calculating the location of a luminous object, calculating a glare line between these two locations and thereby intersects a display unit, and darkening the display unit at the intersection to thereby reduce glare effects perceived by the operator. In one aspect, calculating the location, such as the location of a midpoint between the eyes of an operator, and calculating the location of a luminous object includes one or more of the following steps: communicating with one or more global positioning satellite servers to determine the position of the vehicle and the luminous object; calculating the position of the sun using standard astronomical formulas; and communicating with one or more positioning controllers such as cameras or other controllers that determine operator location within the aircraft or other vehicle. The display unit is darkened by utilizing a pixel controller to darken the screen adaptively based on calculations for the location of glare sources outside the vehicle.

In some embodiments the subject matter described herein is implemented in software in combination with hardware and/or firmware. For example, the subject matter described herein is implemented in software executed by a processor (e.g., a hardware-based processor). In one exemplary implementation, the subject matter described herein is implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, such as field programmable gate arrays, and application specific integrated circuits. In addition, a computer readable medium that implements the subject matter described herein is located on a single device or computing platform or is distributed across multiple devices or computing platforms.

As used herein, the terms "function", "application", and/or "module" refer to software in combination with hardware and/or firmware for implementing features described herein. In some embodiments, a module comprises a field-programmable gateway array, an application-specific integrated circuit, or a processor.

Referring to FIG. 1, in some aspects, a system 100 comprises an at least one display unit 102, such as a transparent display screen, and a pixel controller 112 for the at least one display unit 102, disposed between an operator and all or part of a windshield of a vehicle (aircraft or land-based vehicle) cabin. The system 100 also comprises a computing platform 104 comprising a positioning module 106 configured to calculate the location of a midpoint between the eyes of an operator of the vehicle to establish a first coordinate reference frame, as well to calculate a center-point of an at least one luminous object outside the vehicle that is a source of glare. The positioning module is configured to calculate a line, referred to as a glare line, between these points (the first coordinate reference frame and the center-point of an at least one luminous object outside the vehicle) such that it intersects with the at least one display unit 102. The computing platform comprises a pixel controller 112 that darkens a portion of the at least one display unit 102 corresponding to the location of intersection between the glare line and the at least one display unit 102. In some embodiments, the system is also configured to communicate with one or more global positioning satellite server or servers 116 via a global positioning system (GPS) such that the spatial and temporal coordinates of the vehicle are determined, allowing the coordinates of the center of the luminous object to be determined with reference to a second coordinate reference frame having an origin at the center of the GPS in the vehicle. The computing platform 104 calculates the coordinates of the center of the luminous object with respect to the first coordinate reference frame through a coordinate transformation from the second coordinate reference frame. In some embodiments, the system 100 works in conjunction with an existing GPS within a vehicle. In some embodiments where a vehicle that does not have an existing GPS the vehicle is fitted with a system 100 that includes a positioning module 106 that comprises a GPS module to communicate with global positioning satellite servers 116.

In some aspects, an exemplary system for adaptively offering glare protection comprises an at least one display unit 102 and a pixel controller 112 for the at least one display unit 102. The display unit 102 is disposed between an operator of an aircraft or land-based vehicle and all or part of the windshield of the aircraft or land-based vehicle cabin. In some embodiments such a display unit 102 is a unit commonly referred to as heads-up display type which is generally a transparent screen that does not emit any light of its own. Instead, these displays use the ambient light passing through the active pixels on the display unit. When transparent display unit 102 is placed in an operator's field of vision and displays information, the transmission of the light emitted by the outside world passing through the screen and which reaches the eyes of the operator is attenuated or blocked by the pixels invoked to display the information.

In some aspects, a system 100 disclosed herein comprises a display unit 102 disposed between at least two layers of glass, plexiglass, or any other suitable windshield material. In some aspects, the display unit 102 sandwiched between two layers of windshield material includes a transparent conductive matrix in an electrochromic fluid. In one aspect, the conductive matrix comprises constructed from metallic nanowires, disposed in a matrix-structure arrangement, and which allows for the control of the local opacity and/or color of the electrochromic fluid by applying current and a potential difference across the conductive matrix. In some aspects, a pixel controller 112 darkens a portion of the display unit 102 by manipulating a current and potential difference across the conductive matrix, such that the transmission of light emitted through the display unit 102 at that portion is attenuated or blocked by the pixels of the display unit 102. A pixel controller 112 can control one or more pixels simultaneously to achieve a darkened portion of the display unit 102.

Figure 2:
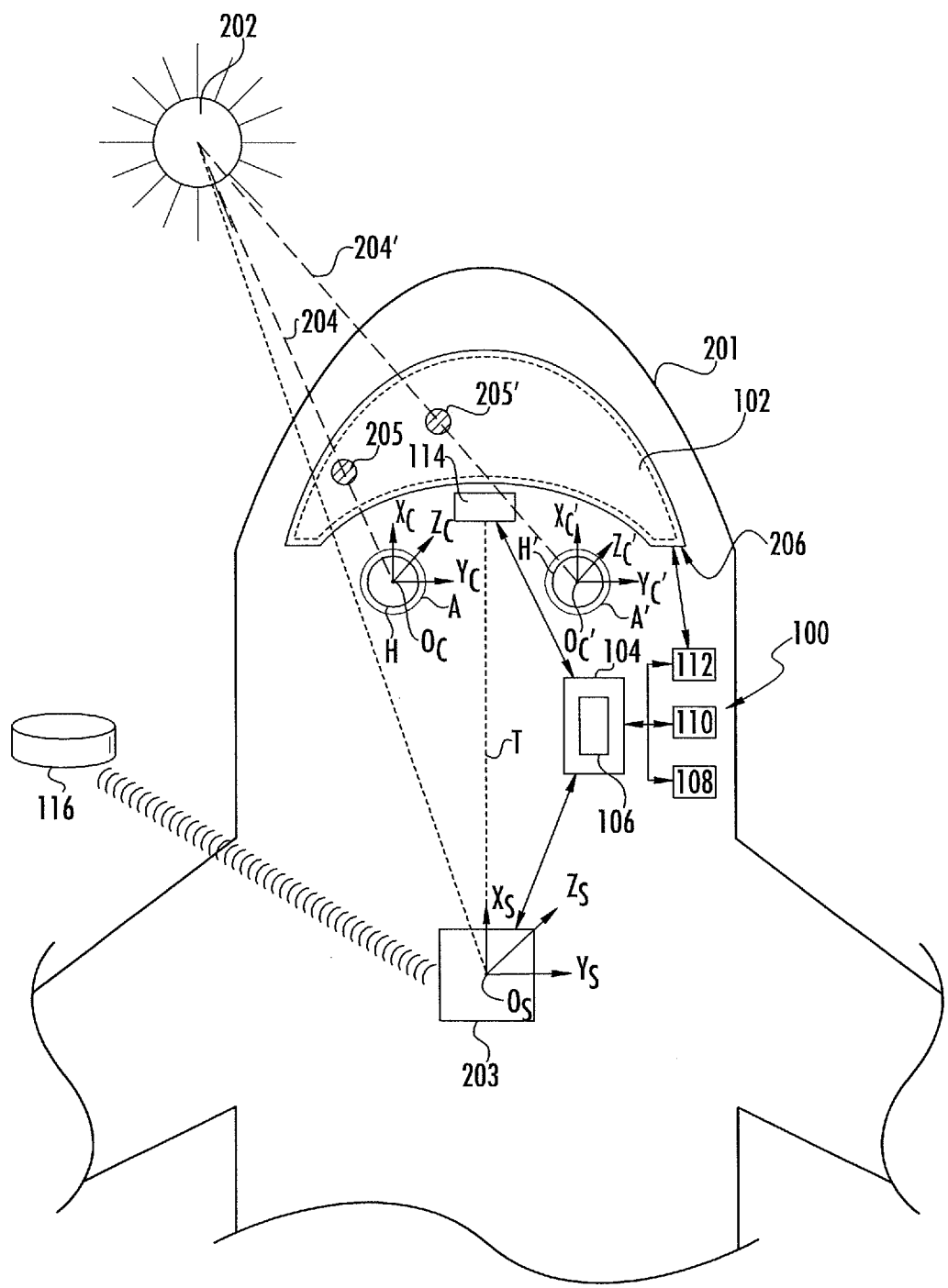
FIG. 2 schematically illustrates an exemplary aircraft with a glare protection system disclosed herein.

Referring to FIG. 2, a system 100 (see FIG. 1) for attenuating glare experienced by a vehicle operator is illustrated in use in an aircraft 201. In order to mitigate glare originating from outside the aircraft 201 by displaying darkened pixels at precise locations on the display unit 102, the computing platform 104 of the system 100 computes coordinates of a center of an at least one luminous object 202, e.g. the sun, outside the aircraft 201 in a first coordinate reference frame denoted by Oc. In first coordinate reference frame Oc the axis Xc is parallel to the roll axis of aircraft 201, axis Zc is parallel to the yaw axis of aircraft 201, and axis Yc is parallel to the pitch axis of aircraft 201. This first coordinate system has an origin Oc that coincides with a midpoint situated between the eyes of the pilot A of the aircraft 201, on the same plane as the pilot's face.

In some embodiments, system 100 comprises a computing platform 104 comprising a positioning module 106 that calculates the location of a midpoint between the eyes of an pilot A, as well to calculate a center-point of an at least one luminous object 202 outside the aircraft 201 that is a source of glare. The positioning module 106 calculates a glare line 204 between these points. Glare experienced by a pilot A of aircraft 201 from luminous object 202 corresponds to glare line 204. Because display unit 102 is disposed between the pilot A and all or part of a windshield 206 of the aircraft 201 cockpit the glare from luminous object 202 passes through display unit 102 before being perceived by the pilot A. Positioning module 106 also calculates the location 205 on display unit 102 intersected by glare line 204.

Computing platform 104 comprise a pixel controller 112 that controls one or more pixels in display unit 102. After calculating the location 205 on display unit 102 intersected by glare line 204 positioning module 106 communicates this location to pixel controller 112 which thereby communicates with display unit 102 and darkens the location 205 of display unit 102 by controlling one or more pixels. The glare effects perceived by the pilot A of aircraft 201 are thereby reduced as the pixels that are controlled by pixel controller 112 attenuate the light passing through display unit 102 at location 205 in such a way that the glare does not impede the pilot's vision.

In some embodiments, the darkened portion 205 of display unit 102 moves across display unit 102 as a function of the changes in orientation of the aircraft 201 with respect to the luminous object 202. This progressive and localized attenuation of a glare line 204, even as a vehicle 201 and/or a luminous object 202 change position, allows for attenuation of glare perceived by pilot A (or co-pilot/navigator A' discussed below) of aircraft 201 during the course of operation of the aircraft 201. In some embodiments, this progressive and localized attenuation of a glare line 204 even as aircraft 201 and/or a luminous object 202 change position is automatic and requires no input from pilot A. This adjustment in the location of the darkened portion 205 is achieved via constant or substantially constant communication between computing platform 104, positioning module 106, pixel controller 112 and display unit 102.

The darkened portion or location 205 of display unit 102 is any suitable shape, such as an arbitrary shape, such as a rectangular or circular region, as necessary to achieve attenuation of a glare line 204. In some embodiments, the darkened portion 205 of display unit 102 is a circular region radiating out from the point of intersection between the glare line 204 and display unit 102 such that the circular region advantageously exhibits a radial gradation whereby there is less filtering of light at the edges of the circular region than at its center. In an embodiment, this filtering would not black out the visual field in the darkened region completely. Instead, light would only be shaded to a maximum value, such as for example 98% of the light filtered. In some aspects, the opacity is at a maximum 20%, 30%, 40%, 50%, 60%, 70%, 80%, 90%, 95% or more of the light filtered. In some aspects the system 100 comprises a manual control to allow the pilot A or co-pilot/navigator A' to control this opacity level.

Continuing with FIG. 2, in some aspects system 100 within an aircraft 201 communicates with GPS servers 116 using a GPS module 203 such that the spatial and temporal coordinates of aircraft 201 are determined. In some embodiments, aircraft 201 having a GPS module 203 communicates with global positioning satellite servers 116 and determines the coordinates of the center of the luminous object 202 when the luminous object 202 is the sun. Computing platform 104 computes the exact position of the center of the sun 202 using data from GPS servers 116 and with respect to the aircraft 201 in a second orthogonal coordinate reference frame (Os, Xs, Ys, Zs). In second coordinate reference frame (Os, Xs, Ys, Zs) the axis Xs is parallel to the roll axis of aircraft 201, axis Zs is parallel to the yaw axis of aircraft 201, and axis Ys is parallel to the pitch axis of aircraft 201. This second coordinate system has an origin Os corresponding to the position of the GPS module 203 onboard the aircraft 201.

In some embodiments, second coordinate reference frame (Os, Xs, Ys, Zs) is chosen such that the axes Xs and Zs are parallel to the roll and yaw axes of aircraft 201, respectively. The axis Ys would then be parallel to the pitch axis of aircraft 201. The algorithm implemented for the computation of the position of the center of the luminal object 202 in the second coordinate reference frame Os comprises solving a formula from astronomy making it possible to determine the azimuth and the elevation of the sun on the basis of the latitude, longitude, and altitude of aircraft 201, as well as the date in the Universal Time System (UT or UTS). GPS module 203 of aircraft 201 provides the spatial and temporal coordinates of aircraft 201. The computing platform determines the coordinates of the center of the sun 202 in the first coordinate reference frame (Oc, Xc, Yc, Zc) whose origin Oc coincides with the midpoint between the eyes of the pilot A on the same plane as the pilot's face. The axes Xc, Yc, Zc are preferably chosen respectively parallel to the axes Xs, Ys, Zs so that the computing platform performs an operation of translating T the coordinates of the center of the sun 202 from the second coordinate reference frame with center Os to the first coordinate reference frame with centre Oc.

In some embodiments, aircraft 201 comprises a flight cockpit comprising a location for a co-pilot or navigator A'. As such, computing platform 104 additionally extrapolates the coordinates of a glaring light in an orthogonal coordinate reference frame (Oc', Xc', Yc', Zc') whose origin Oc' coincides with a midpoint situated between the eyes of the co-pilot/navigator A' on the latter's face. A positioning controller (FIG. 3 discussed below) determines the position of this midpoint. In this embodiment, the axes Xc', Yc', Zc' are preferably chosen respectively parallel to the axes Xs, Ys, Zs so that the computer performs a translation of the coordinates of the center of the sun 202 from the coordinate reference frame with centre Os to the new coordinate reference frame with center Oc'.

Figure 3:
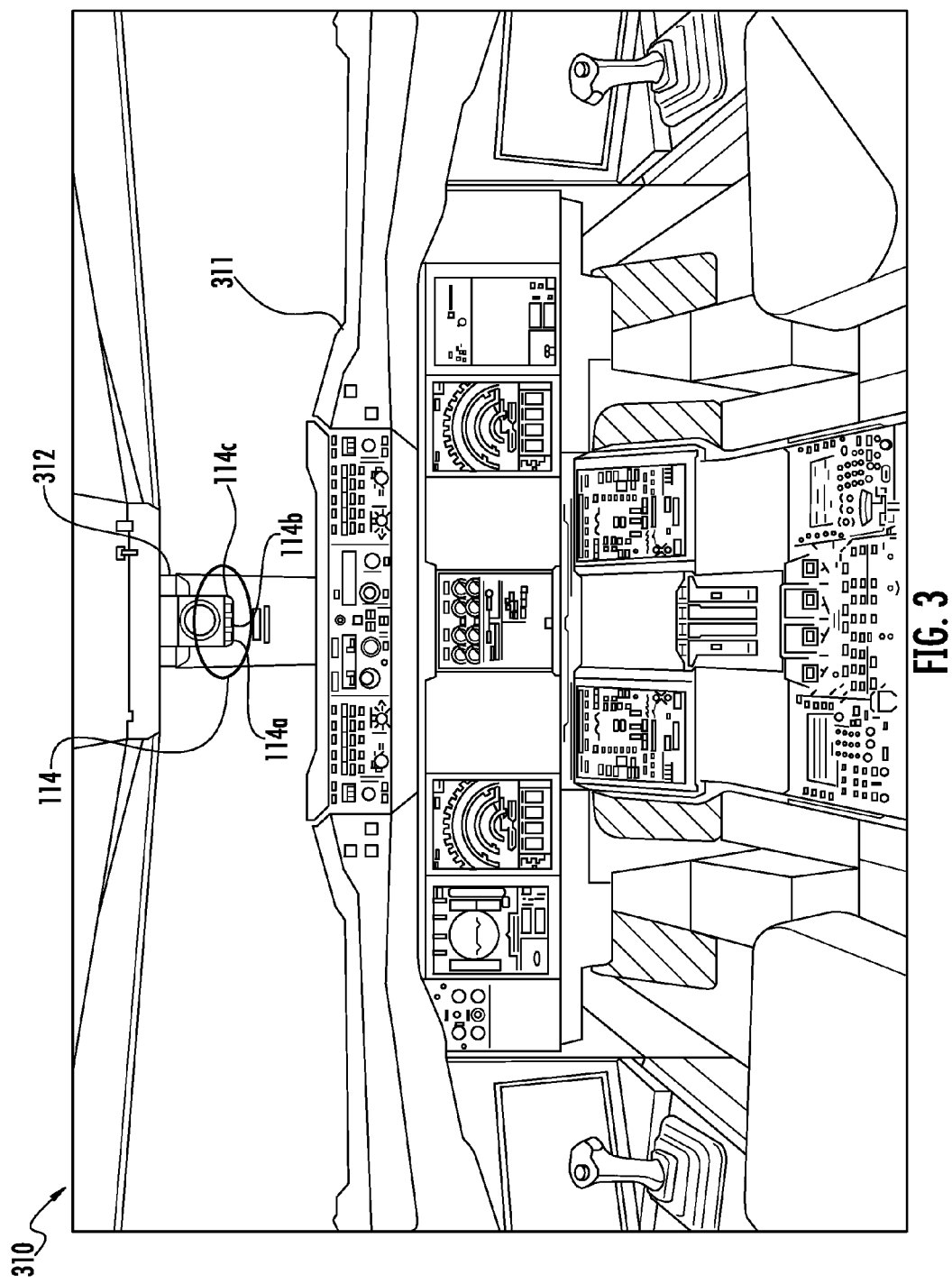
FIG. 3 schematically illustrates an exemplary aircraft dashboard showing a positioning controller used to determine the position of an at least one operator.

In some aspects the system 100 utilizes positioning controllers aboard the aircraft 201. FIG. 3 is a schematic view of the dashboard 311 of an aircraft 201, which illustrates positioning controllers disposed aboard the aircraft 201. The positioning controller 114 is disposed inside the flight deck 310 on the central upright support pillar 312 of the dashboard 311. Positioning controller 114 aids the operating pilot A, and if present a co-pilot/navigator A', to place his or her head in an optimal position predefined during the design of the aircraft.

Positioning controller 114 gives the so-called "pilot's eye" position or computed visual-reference point, which is the position of optimal visibility with respect to all the elements of the dashboard 311. It is on the basis of this position that all the arrangements of the flight cockpit 310 are designed (e.g. windshields, screens, instruments, etc.). This design procedure advantageously allows the pilot A or co-pilot/navigator A' to operate the aircraft with minimal eye or head movement. Therefore the definition of this position in space is standardized and is subject to strict certification rules in terms of visibility so that the position of the origin Oc (FIG. 2) of the first coordinate reference frame is substantially the same for each pilot despite differing physiologies, as this origin Oc coincides substantially with a midpoint between the eyes of the pilot A or co-pilot/navigator A', lying on the plane coinciding with the pilot's A or co-pilot/navigator's A' face.

In some aspects, the positioning controller 114 includes two balls fixed on the central upright support pillar 312 and which the operator must align visually. Aboard an aircraft 102 with more than one operating crew member (i.e., pilot A and co-pilot/navigator A' side by side and symmetrically with respect to a plane of symmetry of the fuselage passing through the central upright support pillar 312 of the dashboard 311) commonly referred to as a "twin crew", the positioning controller 114 takes the form of three reference balls 114a, 114b, and 114c, as illustrated in FIG. 3. Each pilot then adjusts his or her seat until two respective reference balls are aligned.

Figure 4:
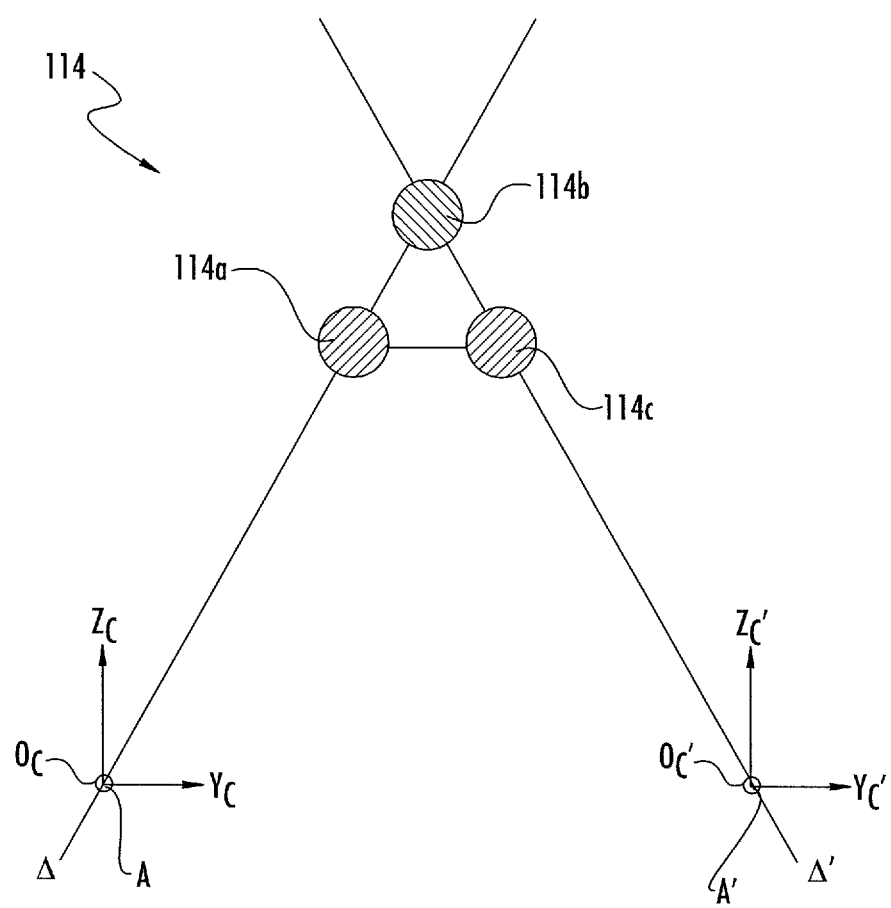
FIG. 4 schematically illustrates a positioning controller using at least three balls to determine the locations of an operator and navigator in an aircraft.

FIG. 4 illustrates the configuration of the positioning controller 114 installed on the central upright support pillar 312 of the dashboard 311 of certain models of aircraft with a twin crew. More precisely, aboard an aircraft with a twin crew (pilot A and co-pilot or navigator A'), the positioning controller 114 comprises a set of three balls 114a, 114b, and 114c of the same dimensions, generally where two of these balls are of one color (114a and 114c in FIG. 4) and the third of a differing color (114b in FIG. 4), forming a triangle. A ball 114b is situated at a vertex of the triangle and is generally a point of the plane of symmetry of the fuselage passing through the central upright support pillar 312, while the other two balls 114a and 114c form the other two vertices of the triangle, which are consequently distributed on each side of this plane. Thus, one of the two balls 114a and 114c is intended for the alignment of the pilot's head A, while the other is intended for the alignment of the co-pilot's or navigator's head A'. In order to adjust the position of his or her seat, the pilot A or the co-pilot/navigator A' places his or her head so that, by occlusion phenomenon, when his or her gaze is directed toward the positioning controller 114, he or she can no longer see the ball 114b. The pilot A then sees only ball 114a, and the co-pilot/navigator A' the ball 114c.

When the pilot A is correctly installed in his or her seat after having performed the adjustments necessary to align the positioning controller 114, the ball 114a is situated on a straight line A passing through the origin $O_c$ coinciding with a midpoint between the eyes of the operator and lying on the plane coinciding with the pilot's face, and the ball 114b. When the co-pilot/navigator A' is correctly installed in his or her seat after having performed the adjustments necessary to align the positioning controller 114, the ball 114c is situated on a straight line Δ' passing through the origin Oc' coinciding with a midpoint between the eyes of the co-pilot/navigator A' and lying on the plane coinciding with the co-pilot's/navigator's face, and the ball 114b.

In another embodiment, the system 100 comprises a positioning controller 114 comprising a camera situated in the cockpit or the flight deck, wherein the camera comprises facial recognition technology. The camera in some embodiments has a field of vision directed toward the pilot A or the co-pilot/navigator A'. The positioning 114 controller has in some embodiments an eye-tracking or face-tracking device. The camera and positioning controller with eye-tracking or face-tracking capability provides this data to the positioning module 114 for use in computing the coordinate frames with respect to the pilot A or the co-pilot/navigator A'. The camera and the eye-tracking or face-tracking controller perform conventional image processing of the image data so as to determine the position of the head of the pilot A or the co-pilot/navigator A' by matching certain characteristic features of the face. In such an embodiment, the computing platform does not perform any change of coordinate reference frame between the second coordinate reference frame centered on the GPS module 203 and the first coordinate reference frame (Oc, Xc, Yc, Zc). It could then be considered that in view of the distance of the sun 202 from aircraft 201, a straight line passing through the center of the first coordinate reference frame (Oc, Xc, Yc, Zc) and the center of the sun 202 is substantially collinear with a straight line passing through the center of the second coordinate reference frame (Os, Xs, Ys, Zs) and the center of the sun 202. Consequently, the coordinates of the center of the sun in the first coordinate reference frame (Oc, Xc, Yc, Zc) are considered to be equal to the coordinates of this center of the sun in the second coordinate reference frame (Os, Xs, Ys, Zs).

In some aspects, positioning controller 114 comprises an arrangement of gyroscopes and/or accelerometers within or associated with a head wearable structure or member, such as for example a pilot's helmet or audio headset (FIG. 2 still). Such an arrangement of gyroscopes and/or accelerometers communicates with the positioning module 108 to determine the position of a pilot, such as pilot A, or co-pilot/navigator A', such that the coordinates for the midpoint between the eyes of the pilot A with head wearable member H, or co-pilot/navigator A' with head wearable member H', that lies on the plane of the operator's face could be calculated and subsequently used in calculating the glare line 204 for dynamically adjusting glare protection on the display unit 102. In some aspects, head wearable member H is linked to positioning module 108 by way of a data cable or wireless communication device.

In some aspects, a system 100 of the instant disclosure comprises a camera installed on the aircraft 201. For simplicity this embodiment is shown only in the context of the land-based vehicle depicted in FIG. 5, but is equally applicable to an aircraft, such as shown in FIG. 2. The camera in some embodiments is a component of positioning controller 114. The system 100 detects the position of the sun 202 during the day, and/or the position of the center of other luminous objects outside the aircraft 201 at night. Such a camera has in some embodiments red, green and blue (RGB) color and/or black-and-white capability, and enables the detection of luminous objects up to distances of several hundred feet. In one embodiment, the camera is a black-and-white complimentary metal-oxide-semiconductor (CMOS) technology camera, which in some embodiments exhibits better sensitivity in respect to luminous objects than RGB cameras. A CMOS camera is preferably mounted behind the windshield 206 in the cockpit of the aircraft 201 so as to have a field of vision close to that of the pilot A. The camera is advantageously equipped with a lens, which offers a field of vision close to that of the human eye, with a focal length of the order of 4 mm to 6 mm.

In some embodiments, computing platform 104 is linked to the camera of positioning controller 114 as well as the GPS module 203, allowing the position of the sun 202 or other luminous source to be determined by the information provided by GPS servers 116 in communication with the GPS module 203 during the day, while the data from the camera images are used at night to determine the position of the center of luminous objects outside the aircraft 201. This embodiment allows for switching between day and night modes in order to utilize the GPS module 203 and/or the camera data accordingly.

When using a camera to determine the coordinate location of a luminous object, the positioning module 106 utilizes image processing making it possible to obtain the spatial coordinates of the centers of luminous objects crossing the trajectory of the vehicle equipped with the device. These coordinates are given in an orthogonal coordinate reference frame of the camera (Oi, Xi, Yi, Zi; shown in FIG. 5) whose origin Oi is for example the central point of the objective of the camera. In the example described here and for the sake of simplification of the computations, the axes Xi and Zi are parallel to the sagittal plane of the vehicle. The axis Yi is an axis perpendicular to this plane.

In some aspects, the coordinates of the center of the luminous object are determined as follows: in the algorithm implemented by the positioning module 106, the images provided by the CMOS camera are firstly threshold with a global threshold of grey level of the pixels. The value of the grey level threshold is determined so as to extract only any luminous objects of a predetermined intensity. In some embodiments, computing platform 104 performs a threshold analysis of the images provided a camera based on a predetermined grey level threshold, wherein the glare from a luminous source is attenuated when the threshold level is exceeded. After the thresholding, the image is segmented into optional blocks of pixels. Each block of pixels, called a block of pixels of interest, corresponds to a luminous object extracted after thresholding of the image. The threshold is chosen high so that two blocks of pixels cannot have any common pixels. In each block of pixels, the pixel having the highest grey level is determined as being the centre of the luminous object emitting glaring light. The coordinates of each of the centers of the blocks of pixels are determined in a third coordinate reference frame (Oi, Xi, Yi, Zi). The grey level value of the center of each luminous object determines the value of the radius of the dark patch at location 205 which will be displayed on the display unit 102. A lookup table of correspondences between the value of the grey level of the center and the radius of the dark patch at location 205 to be displayed is thus recorded in the memory 108 of the computing platform 104.

In some aspects, an operator of a vehicle, such as pilot A, has control over the opacity and/or radius of the dark patch at location 205 which will be displayed on the display unit 102. For example, pilot A, by manipulating a computer interface or control device, can turn system 100 on or off, and control the opacity, opacity or darkness gradient, size, radius, and/or location of the dark patch at location 205 which will be displayed on the display unit 102 as needed to achieve optimal or desired attenuation of glare from a luminous source 202. In some aspects, the size of dark patch at location 205 will be 1.2 times the maximum apparent size of the luminous source 202, such as the sun (determined through geometrical equation considering the minimum distance between earth and sun, the diameter of the sun, and distance between pilot and screen), which can then be adjusted as necessary by pilot A.

During the image processing implemented in the positioning module 106, a processing of the trajectory of the centers using Kalman filters can be performed. The parameters of the state vector are in this case the coordinates of each center in a coordinate reference frame of the image taken by the camera. The Kalman filtering makes it possible to limit the influences of the oscillations due to the irregularities of the airstream, both of the aircraft 201 comprising the camera and of the source of luminous light 202. Furthermore, it allows the prediction of the position of the centers during a limited number of picture frames, useful in situations where a luminous object 202 is hidden by the environment outside the aircraft 201 comprising the system 100.

In some aspects, the system 100 comprises at least two identical CMOS cameras to be installed at different places in the cockpit of the aircraft 201 so as to have a field of vision close to that of the pilot A. Binocular vision allows a precise determination of the coordinates of the centers of luminous objects 202. Known algorithms can then be implemented to compute the coordinates of the center of a luminous object 202 in a coordinate reference frame centered on one of the cameras.

After the determination of the coordinates of the center of a luminous object in the third coordinate reference frame (Oi, Xi, Yi, Zi), the processor 110 computes the coordinates of the center in the first orthogonal coordinate reference frame (Oc, Xc, Yc, Zc).

When the aircraft 201 is equipped with both a GPS module 203 for the determination of the position of the sun 202 by day and with a camera for the detection of luminous objects at night, the switch between the day mode and the night mode is in some embodiments performed automatically. It is in this case dependent on the date in the UTS, provided by the onboard electronics of the aircraft 201 or by the GPS module 203 in communication with the GPS servers 116.

Returning to FIG. 2, by virtue of the determination of the fixed position of the origin Oc, the position of the display unit 102 in the coordinate reference frame (Oc, Xc, Yc, Zc) or (Oc', Xc', Yc', Zc') is be recorded in the memory 108 of the computing platform 104 which then calculates the intersection of the display unit 102 with a glare line 204 or 204' passing through the origin Oc, or Oc' respectively, and the center of the luminous object 202, e.g. the sun. The computing platform 104 gives the commands to the pixel controller 112 for the pixels of the display unit 102 so as to power up certain pixels in order to accurately locate a dark spot 205 (or 205') on display unit 102, at the level of the intersection.

In some aspects, system 100 attenuates glare from a luminous source 202 that is a laser. In some aspects, the display unit 102 comprises a transparent photovoltaic film to detect a laser light or laser beam intersecting the display unit 102. In some aspects, a transparent photovoltaic film is coupled to a nanowire matrix of a display unit 102. As discussed herein, such a display unit 102, coupled with a transparent photovoltaic film, is layered on top of or in parallel of the windshield 206. A detected laser will generate current locally on the photovoltaic film which will enable the nanowire matrix to detect the position of the current. The current position is communicated back to computing platform 104 which will then indicate to pixel controller 112, in some aspects by way of positioning module 106, where to darken a location 205 of display unit 102 by controlling one or more pixels. As illustrated in FIG. 2, the glare effects caused by a laser and perceived by the pilot A, for example, of aircraft 201 are thereby reduced as the pixels that are controlled by pixel controller 112 attenuate the laser light passing through display unit 102 at location 205 in such a way that the glare does not impede the pilot's vision. Furthermore, in some aspects the transparent photovoltaic film of display unit 102 enables the determination of the size of the darkened spot 205 necessary to block glare effects caused by a laser. In some aspects, a display unit 102 with a photovoltaic film to detect a laser, as a component of system 100, will achieve maximum opacity at location 205 of display unit 102 immediately upon detecting a laser, or substantially instantaneously, to thereby prevent injury to a pilot.

Figure 5:
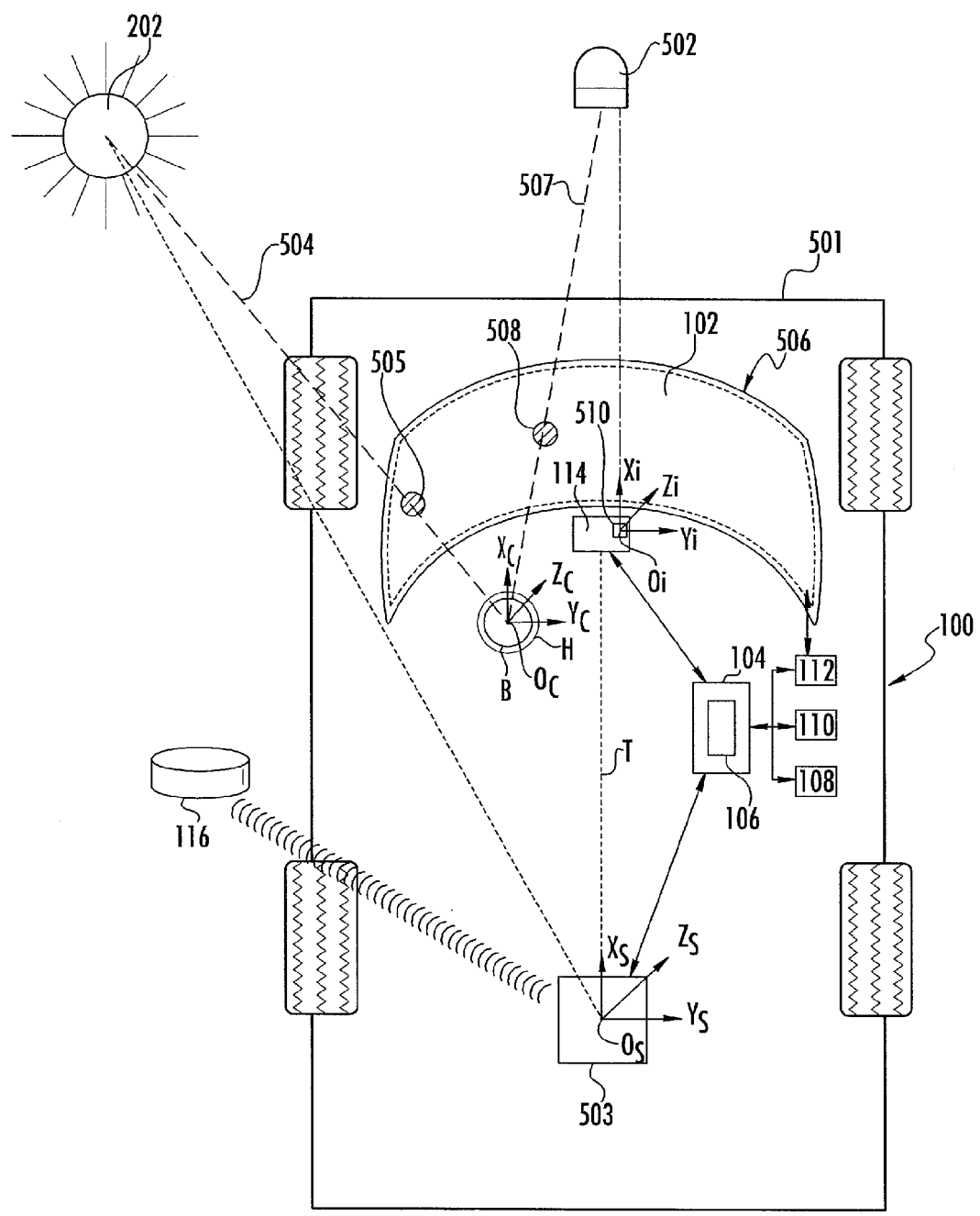
FIG. 5 schematically illustrates an exemplary vehicle with a glare protection system disclosed herein.

FIG. 5 depicts the system 100 in the context of a land-based vehicle. Referring to FIG. 2, a system 100 is illustrated for attenuating glare 504 or 507 experienced by a vehicle operator B. In order to mitigate glare originating from outside the vehicle 501 by displaying darkened pixels at precise locations on the display unit 102, the computing platform 104 of the system 100 computes coordinates of a center of an at least one luminous object 202, e.g. the sun, and/or 502, e.g. a headlight from an oncoming vehicle, outside the vehicle 501 in a first coordinate reference frame denoted by Oc. In first coordinate reference frame Oc the axis Xc is parallel to the roll axis of vehicle 501, axis Zc is parallel to the yaw axis of vehicle 501, and axis Yc is parallel to the pitch axis of vehicle 501. This first coordinate system has an origin Oc that coincides with a midpoint situated between the eyes of the operator B of the vehicle 501, on the same plane as the operator's face.

In some embodiments, system 100 comprises a computing platform 104 comprising a positioning module 106 that calculates the location of a midpoint between the eyes of vehicle operator B, as well to calculate a center-point of an at least one luminous object 202 or 502 outside the vehicle 501 that is a source of glare. The positioning module 106 calculates a glare line 504 or 507 between these points. Glare experienced by operator B of vehicle 501 from luminous object 202 or 502 corresponds to glare line 504 or 507, respectively. Because display unit 102 is disposed between operator B and all or part of a windshield 506 of the vehicle 501 cabin the glare from luminous objects 202 and/or 502 passes through display unit 102 before being perceived by the operator B. Positioning module 106 also calculates the location 505 and/or 508 on display unit 102 intersected by glare line 504 and/or 507, respectively.

Computing platform 104 comprises a pixel controller 112 that controls one or more pixels in display unit 102. After calculating the location 505 or 508 on display unit 102 intersected by glare line 504 or 507, respectively, positioning module 106 communicates this location to pixel controller 112 which thereby communicates with display unit 102 and darkens the location 505 or 508 of display unit 102 by controlling one or more pixels. The glare effects perceived by the operator B of vehicle 501 are thereby reduced as the pixels that are controlled by pixel controller 112 attenuate the light passing through display unit 102 at location 505 or 508 in such a way that the glare does not impede the operator's vision.

In some embodiments, the darkened portion 505 or 508 of display unit 102 moves across display unit 102 as a function of the changes in orientation of the vehicle 501 with respect to the luminous object 202 or 502. This progressive and localized attenuation of a glare line 504 or 507, even as a vehicle 501 and/or a luminous objects 202 and/or 502 change position, allows for attenuation of glare perceived by operator B of vehicle 501 during the course of operation of vehicle 501. In some embodiments, this progressive and localized attenuation of a glare line 504 or 507 even as vehicle 501 and/or a luminous object 202 or 502 change position is automatic and requires no input from operator B. This adjustment in the location of the darkened portion 505 or 508 is achieved via constant or substantially constant communication between computing platform 104, positioning module 106, pixel controller 112 and display unit 102.

The darkened portion or location 505 or 508 of display unit 102 is an arbitrary shape, such as a rectangular or circular region, as necessary to achieve attenuation of a glare line 504 or 507, respectively. In some embodiments, the darkened portion 505 or 508 of display unit 102 is a circular region radiating out from the point of intersection between the glare line 504 or 507 and display unit 102 such that the circular region advantageously exhibits a radial gradation whereby there is less filtering of light at the edges of the circular region than at its center. In an embodiment, this filtering would not black out the visual field in the darkened region completely. Instead, light would only be shaded to a maximum value, such as for example 92% of the light filtered. In some aspects, the opacity is at a maximum 20%, 30%, 40%, 50%, 60%, 70%, 80%, 90%, 95% or more of the light filtered. In some aspects the system 100 comprises a manual control to allow the operator B to control this opacity level.

Continuing with FIG. 5, in some aspects system 100 within vehicle 501 communicates with one or more GPS servers 116 using a GPS module 503 such that the spatial and temporal coordinates of vehicle 501 are determined. In some embodiments, vehicle 501 having a GPS module 503 communicates with global positioning satellite servers 116 and determines the coordinates of the center of the luminous object 202 when the luminous object 202 is the sun. Computing platform 104 computes the exact position of the center of the sun 202 using data from GPS servers 116 and with respect to the vehicle 501 in a second orthogonal coordinate reference frame (Os, Xs, Ys, Zs). The second coordinate reference frame (Os, Xs, Ys, Zs) is chosen such that two axes Xs, Zs of this coordinate reference frame are parallel to the sagittal plane of vehicle 501 (vertical plane separating the vehicle into two halves, left-right), while the other axis Ys is perpendicular to this same plane. This second coordinate system has an origin Os corresponding to the position of the GPS module 503 onboard vehicle 501.

In some embodiments, second coordinate reference frame (Os, Xs, Ys, Zs) is chosen such that the axes Xs and Zs are parallel to the roll and yaw axes of vehicle 501, respectively. The axis Ys would then be parallel to the pitch axis of vehicle 501. The algorithm implemented for the computation of the position of the center of the luminal object 202 in the second coordinate reference frame Os comprises solving a formula from astronomy making it possible to determine the azimuth and the elevation of the sun on the basis of the latitude, longitude, and altitude of vehicle 501, as well as the date in the Universal Time System (UT or UTS). GPS module 503 of vehicle 501 provides the spatial and temporal coordinates of vehicle 501. The computing platform determines the coordinates of the center of the sun 202 in the first coordinate reference frame (Oc, Xc, Yc, Zc) whose origin Oc coincides with the midpoint between the eyes of the operator B on the same plane as the operator's face. The axes Xc, Yc, Zc are preferably chosen respectively parallel to the axes Xs, Ys, Zs so that the computing platform performs an operation of translating T the coordinates of the center of the sun 202 from the second coordinate reference frame with center Os to the first coordinate reference frame with center Oc.

In embodiments, system 100 comprises a positioning controller 114 comprising a camera situated in the cabin of vehicle 501, wherein the camera comprises facial recognition technology. The camera in some embodiments has a field of vision directed toward the operator B. The positioning 114 controller has in some embodiments an eye-tracking or face-tracking device. The camera and positioning controller with eye-tracking or face-tracking capability provides this data to the positioning module 114 for use in computing the coordinate frames with respect to operator B. The camera and the eye-tracking or face-tracking controller perform conventional image processing of the image data so as to determine the position of the head of operator B by matching certain characteristic features of the face. In such an embodiment, the computing platform 104 does not perform any change of coordinate reference frame between the second coordinate reference frame centered on the GPS module 203 and the first coordinate reference frame (Oc, Xc, Yc, Zc). It could then be considered that in view of the distance of the sun 202 from vehicle 501, a straight line passing through the center of the first coordinate reference frame (Oc, Xc, Yc, Zc) and the center of the sun 202 is substantially collinear with a straight line passing through the center of the second coordinate reference frame (Os, Xs, Ys, Zs) and the center of the sun 202. Consequently, the coordinates of the center of the sun in the first coordinate reference frame (Oc, Xc, Yc, Zc) are considered to be equal to the coordinates of this center of the sun in the second coordinate reference frame (Os, Xs, Ys, Zs).

In some aspects, positioning controller 114 comprises an arrangement of gyroscopes and/or accelerometers within an operator's B head wearable member H, such as for example a helmet or audio headset. Such an arrangement of gyroscopes and/or accelerometers communicates with the positioning module 108 to determine the position of operator B such that the coordinates for the midpoint between the eyes of operator B that lies on the plane of the operator's face could be calculated and subsequently used in calculating the glare line 504 and/or 507 for dynamically adjusting glare protection on the display unit 102. In some aspects, head wearable member H is linked to positioning module 108 by way of a data cable or wireless communication device. In some aspects, a system 100 of the instant disclosure comprises a camera 510 installed on vehicle 501. Camera 510 in some embodiments is a component of positioning controller 114. The system 100 detects the position of the sun 202 during the day, and/or the position of the center of another luminous object 502, e.g. a headline of an oncoming vehicle, outside the vehicle 501 at night. Such a camera 510 has in some embodiments red, green and blue (RGB) color and/or black-and-white capability, and enables the detection of luminous objects up to distances of several hundred feet. In one embodiment, the camera 510 is a black-and-white complimentary metal-oxide-semiconductor (CMOS) technology camera, which in some embodiments exhibits better sensitivity in respect to luminous objects than RGB cameras. A CMOS camera is preferably mounted behind the windshield 506 in the cabin of vehicle 501 so as to have a field of vision close to that of the operator B. In some embodiments, such a camera 510 is mounted at the level of a central rear view mirror of vehicle 501, such as at the same level as rain sensors. The camera 510 is advantageously equipped with a lens, which offers a field of vision close to that of the human eye, with a focal length of the order of 4 mm to 6 mm.

In some embodiments, computing platform 104 is linked to camera 510 of positioning controller 114 as well as the GPS module 503, allowing the position of the sun 202 or other luminous source 502 to be determined by the information provided by GPS servers 116 in communication with the GPS module 203 during the day, while the data from the camera 510 images are used at night to determine the position of the center of luminous objects 502 outside the vehicle 501. This embodiment allows for switching between day and night modes in order to utilize the GPS module 503 and/or the camera 510 data accordingly.

When using a camera 510 to determine the coordinate location of a luminous object 502, the positioning module 106 utilizes image processing making it possible to obtain the spatial coordinates of the centers of luminous objects 502 crossing the trajectory of the vehicle 501 equipped with the device. These coordinates are given in an orthogonal coordinate reference frame of the camera (Oi, Xi, Yi, Zi; shown in FIG. 5) whose origin Oi is for example the central point of the objective of camera 510. In the example described here and for the sake of simplification of the computations, the axes Xi and Zi are parallel to the sagittal plane of vehicle 501. The axis Yi is an axis perpendicular to this plane.

The coordinates of the center of the luminous object 502 is determined as follows: in the algorithm implemented by the positioning module 106, the images provided by the CMOS camera 510 are firstly threshold with a global threshold of grey level of the pixels. The value of the grey level threshold is determined so as to extract only any luminous objects 502 of a predetermined intensity. After the thresholding, the image is segmented into optional blocks of pixels. Each block of pixels, called a block of pixels of interest, corresponds to a luminous object 502 extracted after thresholding of the image. The threshold is chosen high so that two blocks of pixels cannot have any common pixels. In each block of pixels, the pixel having the highest grey level is determined as being the center of the luminous object 502 emitting glaring light. The coordinates of each of the centers of the blocks of pixels are determined in a third coordinate reference frame (Oi, Xi, Yi, Zi). The grey level value of the center of each luminous object 502 determines the value of the radius of the dark patch at location 508 which will be displayed on the display unit 102. A lookup table of correspondences between the value of the grey level of the center and the radius of the dark patch at location 508 to be displayed is thus recorded in the memory 108 of the computing platform 104.

During the image processing implemented in the positioning module 106, a processing of the trajectory of the centers using Kalman filters can be performed. The parameters of the state vector are in this case the coordinates of each center in a coordinate reference frame of the image taken by the camera. The Kalman filtering makes it possible to limit the influences of the oscillations due to the irregularities of the roadway or terrain upon which vehicle 501 comprising camera 510 and of the source of luminous light 502. Furthermore, it allows the prediction of the position of the centers during a limited number of picture frames, useful in situations where a luminous object 502 is hidden by the environment outside the vehicle 501 comprising system 100.

In some aspects, the system 100 comprises at least two identical CMOS cameras 510 to be installed at different places in the cabin of the vehicle 501 so as to have a field of vision close to that of the operator B. Binocular vision allows a precise determination of the coordinates of the centers of luminous objects 502. Known algorithms can then be implemented to compute the coordinates of the center of a luminous object 502 in a coordinate reference frame centered on one of the cameras 510.

After the determination of the coordinates of the center of a luminous object 502 in the third coordinate reference frame (Oi, Xi, Yi, Zi), the processor 110 computes the coordinates of the center in the first orthogonal coordinate reference frame (Oc, Xc, Yc, Zc).

When vehicle 501 is equipped with both a GPS module 503 for the determination of the position of the sun 202 by day and with a camera 510 for the detection of luminous objects 502 at night, the switch between the day mode and the night mode is in some embodiments performed automatically. It is in this case dependent on the date in the UTS, provided by the onboard electronics of the vehicle 501 or by the GPS module 503 in communication with the GPS servers 116.

Continuing with FIG. 5, by virtue of the determination of the fixed position of the origin Oc, the position of the display unit 102 in the coordinate reference frame (Oc, Xc, Yc, Zc) is be recorded in the memory 108 of the computing platform 104 which then calculates the intersection of the display unit 102 with a glare line 504 or 507 passing through the origin Oc, and the center of the luminous object 202 or 502, respectively. The computing platform 104 gives the commands to the pixel controller 112 for the pixels of the display unit 102 so as to power up certain pixels in order to accurately locate a dark spot 505 or 508 on display unit 102, at the level of the intersection.

In some aspects, system 100 further comprises a device to control cockpit brightness in the case of an aircraft 201, or cabin brightness in the case of a vehicle 501. A device or system to control cockpit or cabin brightness adjusts the luminosity of the cockpit of cabin in accordance with measured or perceived brightness of the exterior of the aircraft 201 or vehicle 501. Such brightness functionality works in conjunction with glare attenuation of system 100. In some aspects, the display unit 102 comprises a transparent photovoltaic film to detect and/or map out sources and intensities of light coming into the cockpit or cabin from outside the vehicle. In some aspects, a transparent photovoltaic film is coupled to a nanowire matrix of a display unit 102. As discussed herein, such a display unit 102, coupled with a transparent photovoltaic film, is layered on top of or in parallel of the windshield 206. Display unit 102, in communication with computing platform 104 and pixel controller 112, darkens at a location 205 of display unit 102, or in some embodiments across the entrie display unit 102, to thereby adjust the luminosity of the cockpit of cabin of the aircraft 201 or vehicle 501. In some aspects, display unit 102 is darkened in various shades across the complete display to reach a desired ISO level or some predetermined level suitable for optimal visual acuity.

System 100 further comprises in some embodiments photodetection devices for detecting the presence of a luminous object outside the vehicle in the field of vision of the operator. Photodetection devices produce a voltage whose amplitude is dependent on the brightness received originating from the luminous object. In some embodiments, photodetection devices, such as photodiodes, are preferably disposed in the cabin of the aircraft 201 or vehicle 501 in which system 100 is installed. The output of the photodetection devices is connected to one or more input ports of the computing platform 104.

Each of the photodiodes provides a voltage proportional to the lighting that it receives. This voltage is compared, in a comparator, with a predetermined threshold recorded in the memory 108 of the computing platform 104. If the voltage dispatched by a photodiode is greater than the predetermined threshold, then a Boolean signal equal to 1, output by the comparator, is dispatched to the computing platform 104 which powers up the pixel controller 112 of the display unit 102.

Consequently, by virtue of the photodetection devices, system 100 in some aspects is triggered only when the light sensed from sun 202 or luminous source 502 is likely to cause glare effects in an aircraft 201 or vehicle 501. Thus, the present subject matter does not operate by day when the weather is overcast in the case where the computing platform 104 receives data from the GPS servers 116, or at night when lights received in the cockpit of the aircraft 201 or vehicle 501 from a luminous source 502 are not sufficiently intense to cause glare effects to the pilot A or operator B when the computing platform 104 receives image data from a CMOS camera 510.

In some embodiments, when the photodetection devices include photodiodes, and when the voltage output by a photodiode exceeds the predetermined threshold, the pixel controller 112 remains powered up for a predetermined minimum time interval which is counted by a clock. This provision prevents, for example at night, the restarting of the device in respect of glare sources detected at different time intervals.

The predetermined detection threshold at night is different from that used by day. Indeed, at night, a photodetection threshold will be chosen so as not to activate system 100 for non-glaring lights such as city lighting or the rear lights of a vehicle ahead of vehicle 501 in which system 100 according to the present subject matter is installed.

In the case of a land-based vehicle 501, e.g., an automotive vehicle, the photodetection device comprises a single photodiode placed inside the cabin of vehicle 501 so as to sense the light received by operator B. This photodiode is installed on the dashboard of vehicle 501 or at the level of the central rear view mirror of vehicle 501. It may for example be the photodiode used for the automatic turning on of the headlamps of vehicle 501.

In the case of an aircraft 201, the photodetection device preferably comprises a plurality of photodiodes placed inside the flight deck, with a photodiode advantageously dedicated to each window, so as to sense the light level received by the pilot A over the whole of his or her field of vision.

A system 100 as disclosed herein is installable on an aircraft 201 or a vehicle 501 during its design, whereby display unit 102 is incorporated into existing glass surfaces such as a windshield or cockpit window. It is also installable in the case of an upgrade of already utilized hardware (i.e., a retrofit of an aircraft 201 or a vehicle 501). Such an installation would involve disposing the transparent display unit 102 between the existing window or glass panel and the operator. If the present subject matter were installed during the design process, it can be disposed into the assembly of the window or windscreen, and it could comprise at least two layers of glass between which is disposed a transparent conductive matrix in an electrochromic fluid. The conductive matrix can be constructed from metallic nanowires, disposed in a matrix-structure arrangement, and which allows for the control of the local opacity and/or color of the electrochromic fluid by applying current and a potential difference across the conductive matrix. In some embodiments, display unit 102 is an information display screen of organic light-emitting diode (OLED) type, for example. The present subject matter comprises a pixel controller 112 that darkens a portion of the at least one display unit 102 through manipulation of a current and potential difference across the conductive matrix, such that the transmission of light emitted through display unit 102 is attenuated or blocked by the pixels of display unit 102.

In some embodiments, in the case of an upgrade or retrofit, the transparent display unit 102 comprising the same sandwich structure detailed above is disposed parallel to an existing window, installed within a framing support structure or mount. The display unit 102 is preferably overlaid on the windscreen of the aircraft 201 or a vehicle 501 over all or part of its surface. The display unit 102 is glued or fixed mechanically by suitable fasteners. The display unit 102, its computing platform 104, and any associated computer readable media are thereafter connected to the aircraft's 201 or vehicle's 501 power supply, avionics, and/or data electronics.

Figure 6:
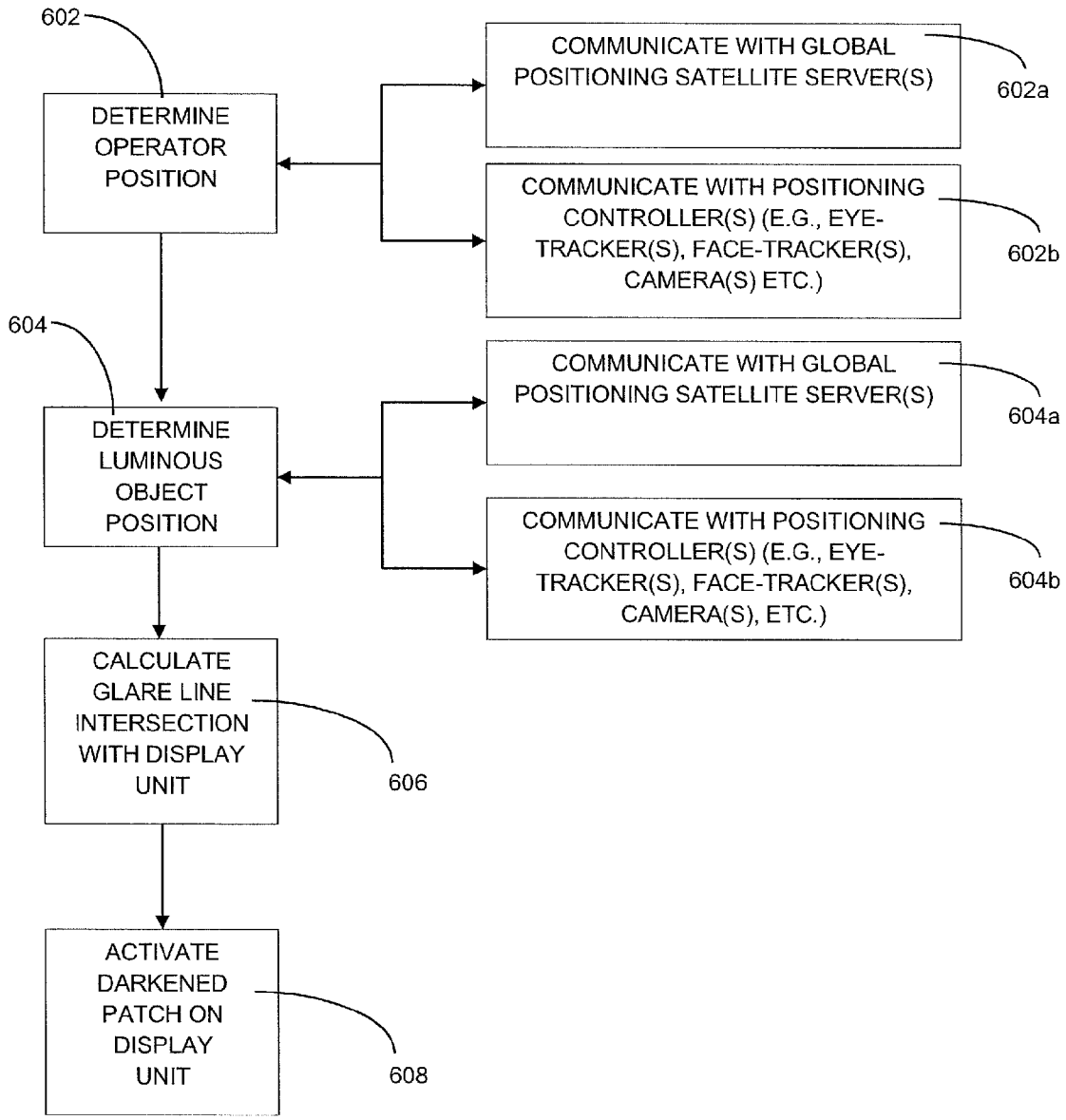
FIG. 6 is a block diagram illustrating steps for determining coordinate locations between a luminous object as glare source and an operator, which is then used to provide protection from glare.

FIG. 6 is a block diagram illustrating steps for determining coordinate locations between a luminous object as a glare source and an operator in an aircraft or vehicle, which is then used to offer protection from glare. Such a method comprises determining the aircraft pilot or vehicle operator position 602, determining the position of the luminous object 604, calculating a glare line that connects these two locations and thereby intersects a display unit 606, and darkening the display unit at the intersection to thereby reduce glare effects perceived by the operator 608. The method occurs, at least in part, at a computing platform including a processor and memory. Determining the aircraft pilot or vehicle operator position, including calculating the location of a midpoint between the eyes of the pilot or operator, and calculating the location of a luminous object, include one or more of: communicating with one or more global positioning satellite servers to determine the position of the aircraft or vehicle 602*a* and the luminous object 604*a*; and communicating with one or more positioning controllers 602*b*, 604*b*, such as for example eye-tracking technology, face-tracking technology, and/or a camera. The display unit 102 is darkened by utilizing a pixel controller to darken the screen adaptively based on calculations for the location of glare sources outside the vehicle.

Figure 7:
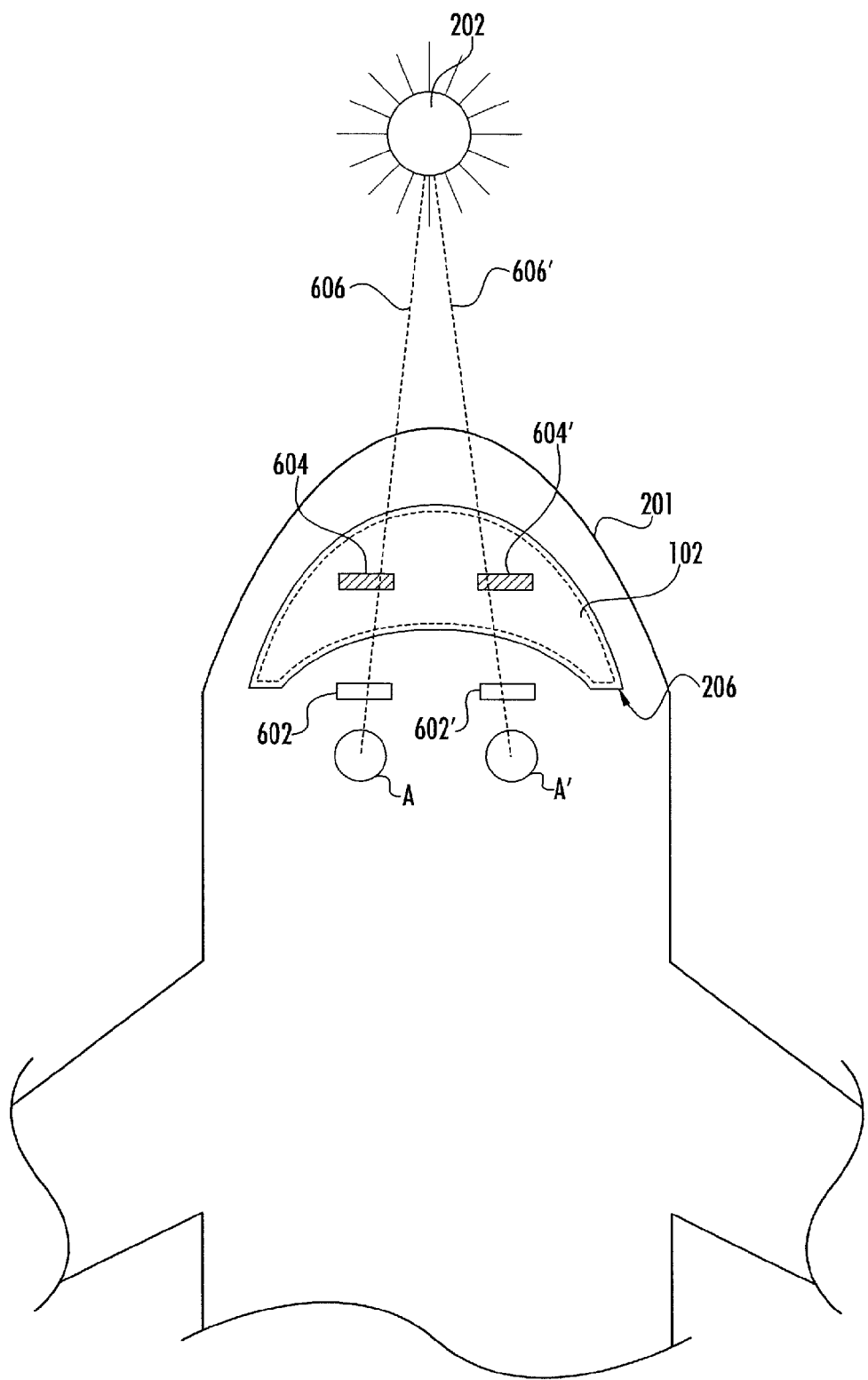
FIG. 7 schematically illustrates an exemplary aircraft with a glare protection system disclosed herein.

FIG. 7 schematically illustrates an exemplary aircraft with a glare protection system disclosed herein. In some aspects, an aircraft 201 has an aeronautics heads-up display 602 or 602' viewable by a pilot A and/or co-pilot A', respectively. Heads-up display 602 or 602' comprise in some embodiments a lens or other transparent surface mounted in front of pilot A and/or co-pilot A', and between pilot A and/or co-pilot A' and windshield 206. In some aspects, heads-up display 602 or 602' reflects light coming from a projector within the cockpit of aircraft 201, such as for example above pilot A and/or co-pilot A', and thereby displays information viewable by pilot A and/or co-pilot A'. Because heads-up display 602 or 602' is a transparent material, which allows pilot A and/or co-pilot A' to see through heads-up display 602 or 602' and out windshield 206, glare from a luminous source 202 outside aircraft 201 can make it difficult to view light projected onto heads-up display 602 or 602'. Thus, in some aspects, display unit 102 of system 100 darkens a location 604 and/or 604' on display unit 102 that aligns with a pilot's A and/or co-pilot's A' field of view of display 602 or 602', respectively. Location 604 and/or 604' on display unit 102 can be predetermined based on a predetermined location of heads-up display 602 or 602', or can be adjusted, by pilot A and/or co-pilot A' for example, to align with the location of heads-up display 602 or 602'. By darkening a location 604 and/or 604' on display unit 102 that aligns with a pilot's A and/or co-pilot's A' field of view of display 602 or 602' a glare line 606 or 606' can be attenuated such that glare does not adversely affect a pilot's A and/or co-pilot's A' ability to view light reflected on display 602 or 602'. The necessary contrast to view heads-up display 602 or 602' can be achieved by darkening a location 604 and/or 604' as described. In some aspects, an operator, such as pilot A or co-pilot A', can activate system 100 to darken a location 604 and/or 604' on display unit 102 that aligns with a pilot's A and/or co-pilot's A' field of view of display 602 or 602' only when necessary or when display 602 or 602' is in use. Such activation is achievable by manipulating a computer interface or control device. Likewise, the size, location and/or intensity of darkened location 604 and/or 604' can be manipulated by an operator through a computer interface or control device. Although only illustrated in the context of an aircraft, such a system is equally applicable to a land-based vehicle.

While the glare protection systems and computer readable media have been described herein in reference to specific aspects, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein. Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

What is claimed is:

1. A system for attenuating glare, comprising:
 a display unit interposed between an operator of an aircraft and all or part of a windshield of the aircraft;
 a controller for controlling the display unit,
 a positioning module for determining a position of the operator inside the aircraft, and a positioning controller, wherein the positioning controller is in communication with the positioning module, wherein the positioning controller comprises a global positioning system for determining a position of at least one luminous object outside the aircraft that is a source of glare, wherein the positioning controller is configured to determine the position of at least one luminous object outside the aircraft in a first coordinate reference frame, wherein the origin of the first coordinate reference frame coincides with the location of the operator inside the aircraft, wherein the positioning controller is configured to determine the position of at least one luminous object outside the aircraft in a second coordinate reference frame, wherein the origin of the second coordinate reference frame coincides with the location of the global positioning system, and wherein the position of the luminous object is then calculated with respect to the first coordinate reference frame through a coordinate transformation with the second coordinate reference frame;
 a computing platform for computing a glare line between the operator and luminous object and the position of the display unit where the glare line intersects the display unit; and
 wherein the computing platform is configured to communicate to the controller the position of the display unit where the glare line intersects the display unit and the controller is configured to cause the display unit at the position of the intersection to darken thereby attenuating the glare.

2. The system of claim 1, wherein the positioning controller comprises a first camera, wherein the camera determines the location of the luminous object outside the aircraft in a first coordinate reference frame on the basis of data of images provided by the said first camera, wherein the origin of the first coordinate reference frame coincides with the location of the operator inside the aircraft.

3. The system of claim 2, wherein the computing platform determines the position of the luminous object outside the aircraft in a third coordinate reference frame having an origin in the first camera, and then determines the position of the luminous object outside the aircraft in a first coordinate reference frame having an origin in the operator through a coordinate transformation.

4. The system of claim 2, wherein the computing platform performs a threshold analysis of the images provided by the first camera based on a predetermined grey level threshold, wherein the glare from a luminous source is attenuated when the threshold level is exceeded.

5. The system of claim 2, wherein the positioning module for determining the position of at least one luminous object outside the aircraft further comprises a second camera.

6. The system of claim 1, wherein the positioning controller comprises a camera having eye or facial recognition capabilities to determine the position of the operator of the aircraft.

7. The system of claim 1, wherein the positioning controller comprises a gyroscope or accelerometer within a head wearable member worn by the operator of the aircraft to determine the position of the operator of the aircraft.

8. The system of claim 1, further comprising a photodetection device for detecting the presence of a luminous object outside the aircraft, wherein the photodetection device is configured to produce a voltage amplitude proportional to the brightness of the luminous object, wherein the pixel controller is powered up only on condition that the voltage produced by the photodetection device is greater than a predetermined detection threshold.

9. The system of claim 1, wherein the display unit further comprising a photovoltaic film configured to detect light from an exterior of the aircraft, wherein the display unit darkens to control the luminosity of the interior of the in accordance with the brightness of the exterior of the aircraft.

10. An aircraft or spacecraft equipped with the system of claim 1.

11. A method for attenuating glare experienced by an operator of an aircraft, the method comprising:
 determining an aircraft operator position;
 determining a position of a luminous object that is a source of glare by communicating with a global positioning system, wherein determining the location of the luminous object using a global positioning system comprises communicating with one or more global positioning satellite servers and determining the position of at least one luminous object outside the aircraft in a first coordinate reference frame, wherein the origin of the first coordinate reference frame coincides with the location of the operator inside the aircraft, determining the position of at least one luminous object outside the aircraft in a second coordinate reference frame, wherein the origin of the second coordinate reference frame coincides with the location of the global positioning system, and wherein the position of the luminous object is then calculated with respect to the first coordinate reference frame through a coordinate transformation with the second coordinate reference frame;

calculating a glare line between the aircraft operator position and the position of the luminous object; and darkening a display unit at an intersection of the glare line and the display unit to reduce glare effects perceived by the operator.

12. The method of claim 11, wherein determining the aircraft operator position comprises calculating the location of a midpoint between the eyes of the operator using a positioning controller equipped with eye-tracking technology, face-tracking technology, or a camera.

13. A method for attenuating glare experienced by an operator of an aircraft, the method comprising:

determining an aircraft operator position by using one or more gyroscopes and/or accelerometers;

determining a position of a luminous object that is a source of glare by communicating with a global positioning system, wherein determining the location of the luminous object using a global positioning system comprises communicating with one or more global positioning satellite servers and determining the position of at least one luminous object outside the aircraft in a first coordinate reference frame, wherein the origin of the first coordinate reference frame coincides with the location of the operator inside the aircraft, determining the position of at least one luminous object outside the aircraft in a second coordinate reference frame, wherein the origin of the second coordinate reference frame coincides with the location of the global positioning system, and wherein the position of the luminous object is then calculated with respect to the first coordinate reference frame through a coordinate transformation with the second coordinate reference frame;

calculating a glare line between the aircraft operator position and the position of the luminous object; and darkening a display unit at an intersection of the glare line and the display unit to reduce glare effects perceived by the operator.

14. The method of claim 13 wherein the one or more gyroscopes and/or accelerometers are positioned within a head wearable member of the aircraft operator.

15. The method of claim 14 wherein the head wearable member comprises a helmet or audio headset.

16. A non-transitory computer readable medium having stored thereon executable instructions that when executed by the processor of a computer control the computer to perform steps comprising:

determining an aircraft operator position;

determining a position of a luminous object that is a source of glare by communicating with a global positioning system, wherein determining the position of the luminous object using a global positioning system comprises communicating with one or more global positioning satellite servers and determining the position of at least one luminous object outside an aircraft in a first coordinate reference frame, wherein the origin of the first coordinate reference frame coincides with the location of the operator inside the aircraft, determining the position of at least one luminous object outside the aircraft in a second coordinate reference frame, wherein the origin of the second coordinate reference frame coincides with the location of the global positioning system, and wherein the position of the luminous object is then calculated with respect to the first coordinate reference frame through a coordinate transformation with the second coordinate reference frame;

calculating a glare line between the aircraft operator position and the position of the luminous object; and darkening a display unit at an intersection of the glare line and the display unit to reduce glare effects perceived by the operator.

17. A non-transitory computer readable medium having stored thereon executable instructions that when executed by the processor of a computer control the computer to perform steps comprising:

determining an aircraft operator position by using one or more gyroscopes and/or accelerometers;

determining a position of a luminous object that is a source of glare by communicating with a global positioning system, wherein determining the position of the luminous object using a global positioning system comprises communicating with one or more global positioning satellite servers and determining the position of at least one luminous object outside an aircraft in a first coordinate reference frame, wherein the origin of the first coordinate reference frame coincides with the location of the operator inside the aircraft, determining the position of at least one luminous object outside the aircraft in a second coordinate reference frame, wherein the origin of the second coordinate reference frame coincides with the location of the global positioning system, and wherein the position of the luminous object is then calculated with respect to the first coordinate reference frame through a coordinate transformation with the second coordinate reference frame;

calculating a glare line between the aircraft operator position and the position of the luminous object; and darkening a display unit at an intersection of the glare line and the display unit to reduce glare effects perceived by the operator.

18. A system for attenuating glare from a laser, comprising:

a display unit interposed between an operator of an aircraft and all or part of a windshield of the aircraft;

a controller for controlling the display unit;

a photovoltaic film to detect a laser intersecting the display unit;

a nanowire matrix configured to detect a current from the photovoltaic film caused by the intersecting laser; and wherein the nanowire matrix is configured to communicate to the controller the location on the display unit intersected by a laser and the controller is configured to cause the display unit at the location of the intersection to darken thereby attenuating the glare from the laser.

19. A system for attenuating glare, comprising:
a display unit interposed between an operator of an aircraft and all or part of a windshield of the aircraft;
a heads-up display mounted between an operator of an aircraft and the display unit;
a controller for controlling the display unit;
a positioning module for determining a position of the operator inside the aircraft, and a positioning controller, wherein the positioning controller is in communication with the positioning module, wherein the positioning controller comprises a global positioning system for determining a position of at least one luminous object outside the aircraft that is a source of glare, wherein the positioning controller is configured to determine the position of at least one luminous object outside the aircraft in a first coordinate reference frame, wherein the origin of the first coordinate reference frame coincides with the location of the operator inside the aircraft, wherein the positioning controller is configured to determine the position of at least one luminous object outside the aircraft in a second coordinate reference frame, wherein the origin of the second coordinate reference frame coincides with the location of the global positioning system, and wherein the position of the luminous object is then calculated with respect to the first coordinate reference frame through a coordinate transformation with the second coordinate reference frame;
a computing platform for computing a glare line between the operator and luminous object and the position of the display unit where the glare line intersects the display unit;
wherein the computing platform is configured to communicate to the controller the position of the display unit where the glare line intersects the display unit; and
wherein the controller is configured to communicate with the display unit to cause the display unit to darken at a location of the display unit corresponding to a line of sight of the operator when viewing the heads-up display to thereby attenuate glare on the heads-up display from a luminous source.

20. The system of claim 19, wherein the heads-up display is a transparent surface upon which information is displayed and viewable by the operator.

21. The system of claim 19, wherein the location of the display unit that is darkened is predetermined based on a predetermined location of the heads-up display.

* * * * *